Feb. 5, 1946. S. W. BRIGGS ET AL 2,393,965
DEHYDRATION OF OIL
Filed June 26, 1942 4 Sheets-Sheet 4
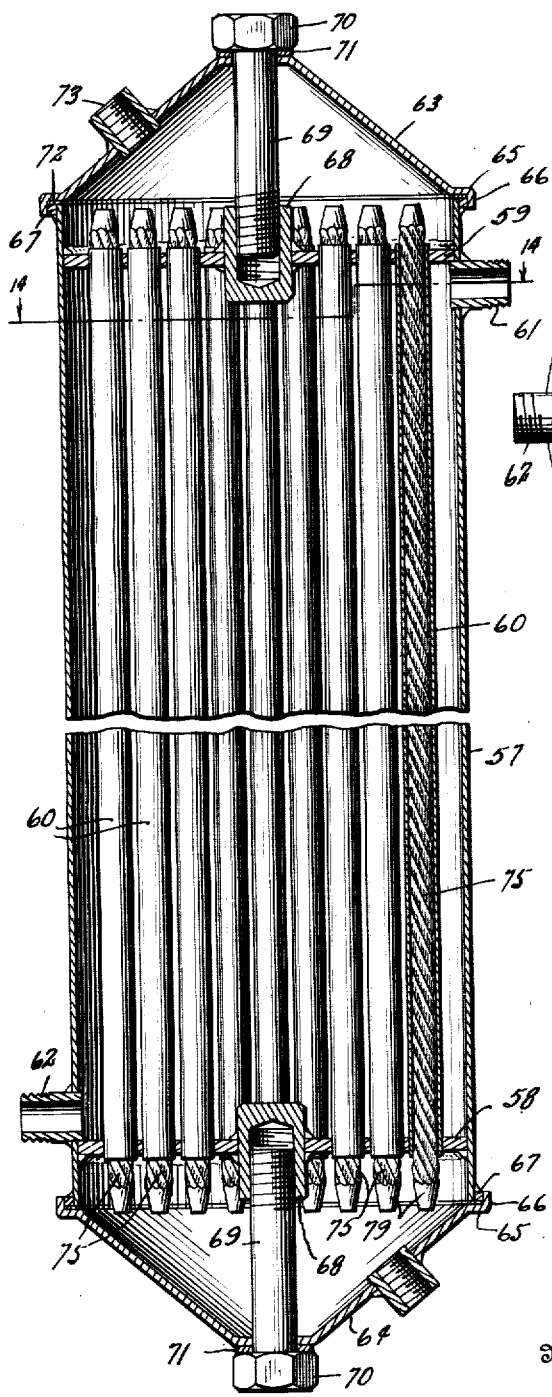
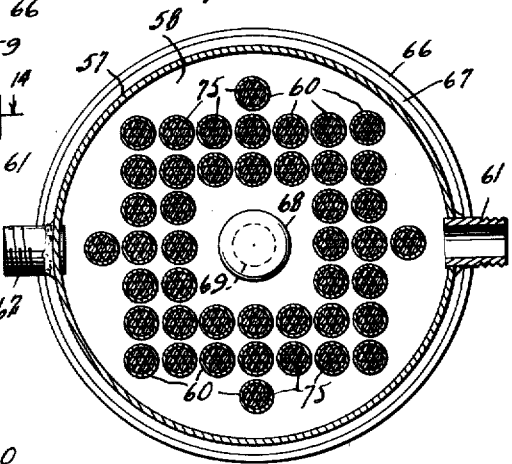
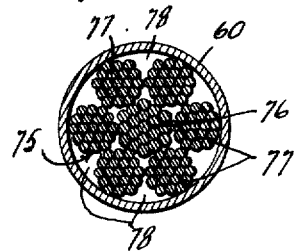
Inventors
SOUTHWICK W. BRIGGS,
WALTER C. BAUER,
WALTER J. EWBANK
& ROSCOE C. PORTER
By Semmes, Keegin Beale & Semmes
Attorneys Patented Feb. 5, 1946

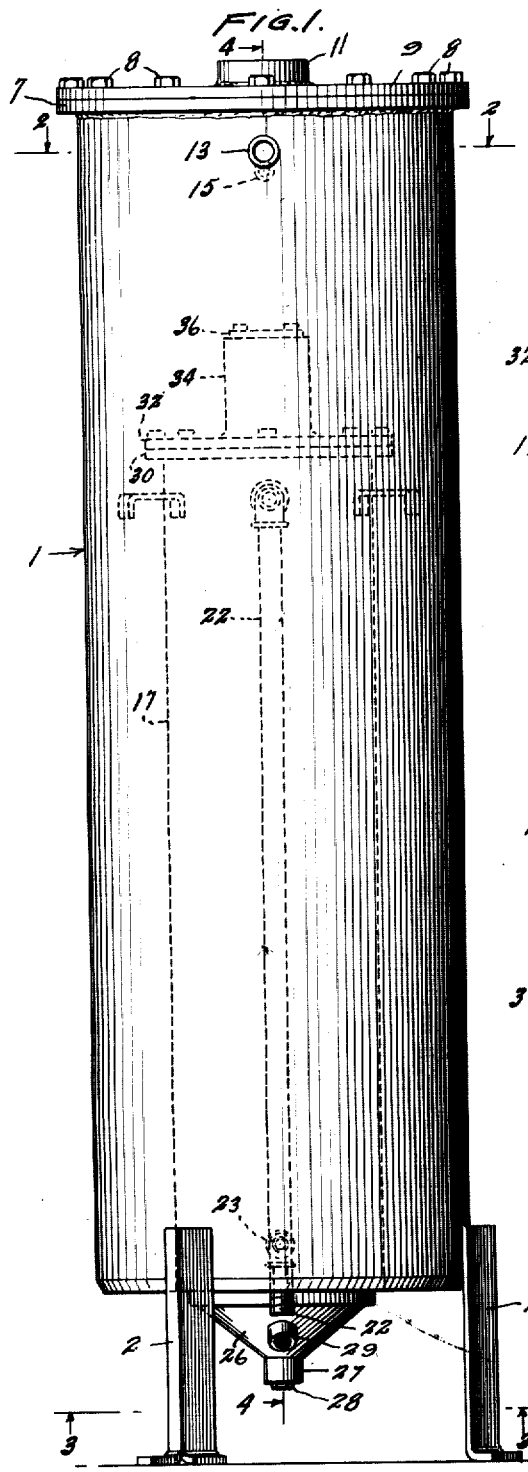

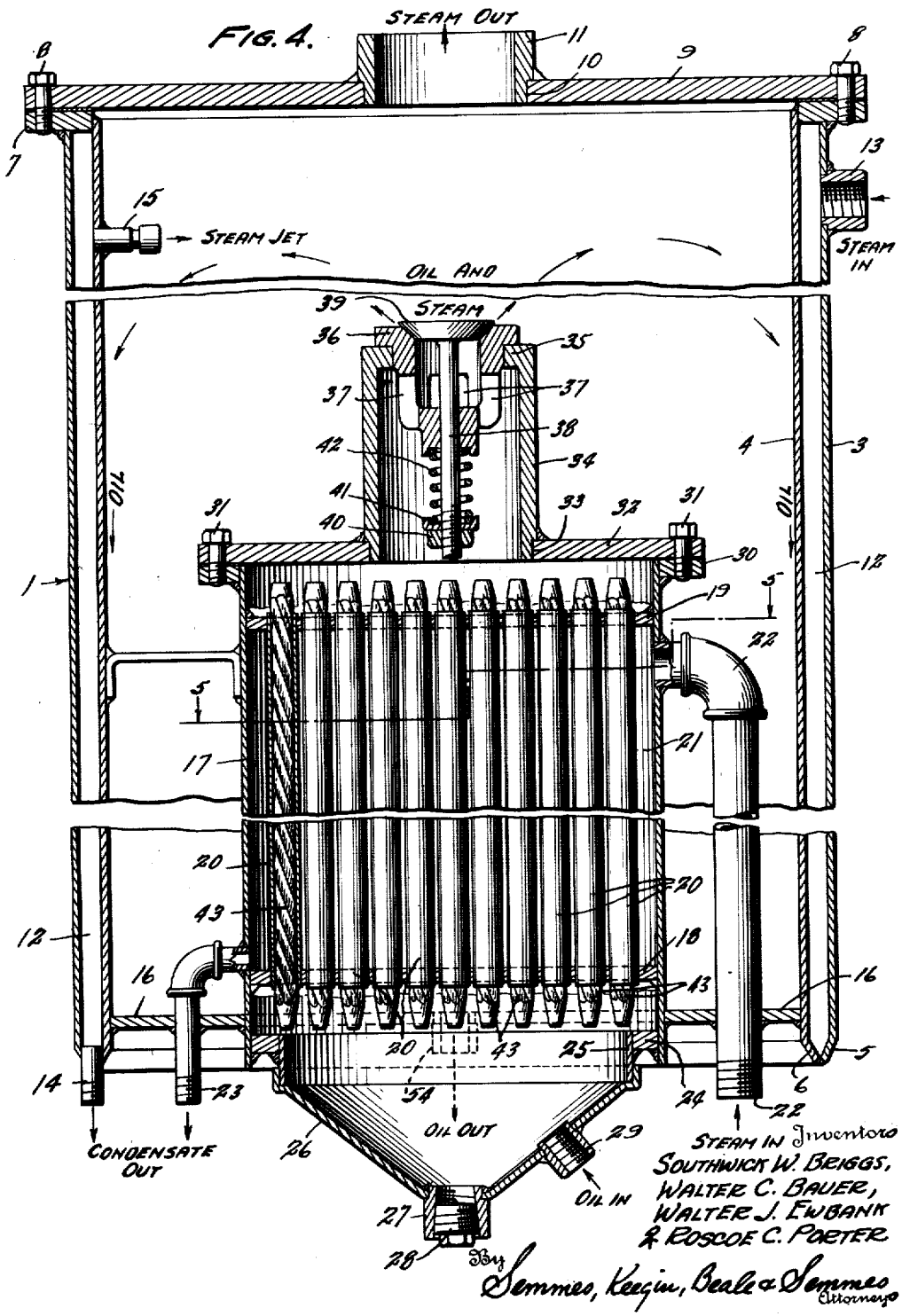

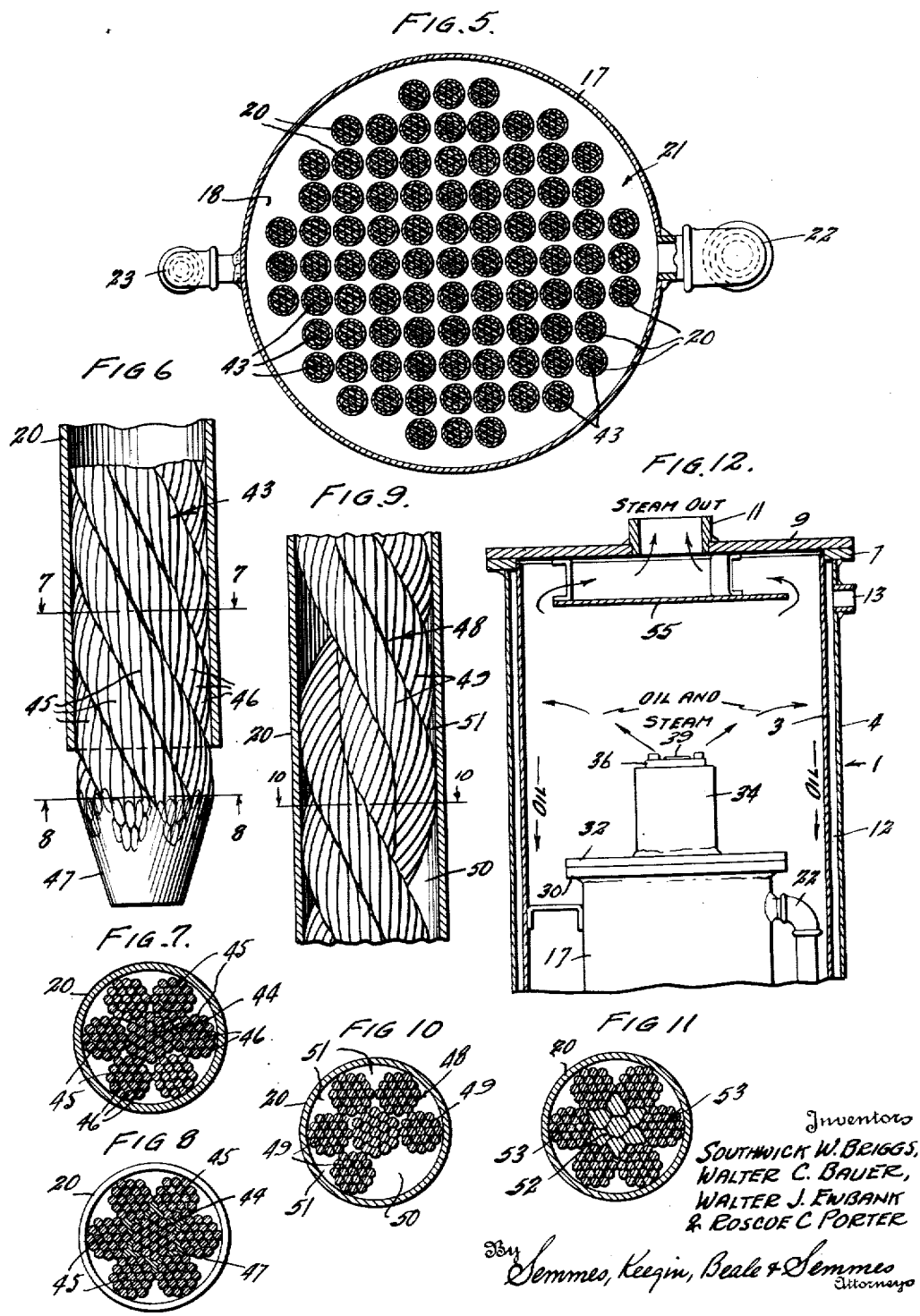

2,393,965

UNITED STATES PATENT OFFICE 2,393,965

DEHYDRATION OF OIL

Southwick W. Briggs, Washington, D. C., and Walter C. Bauer, Chevy Chase, and Walter J. Ewbank, Kensington, Md., and Roscoe C. Porter, Arlington, Va., assignors to Briggs Clarifier Company, Washington, D. C., a corporation of Delaware Application June 26, 1942, Serial No. 448,698

11 Claims. (Cl. 196—5)

This invention relates in general to the treatment of oil and more particularly has reference to the heating and dehydration of oil. Quite frequently oil for use in the lubrication of machinery and especially for use in internal combustion engines is rendered unfit for further use due to its admixture with water. Often water becomes emulsified with the oil and produces a viscous gel-like mass, rendering the oil unfit for lubricating purposes. A number of devices have been developed for treating oil to separate the moisture content therefrom and these are successful to varying degrees. Most of the prior devices are rather complicated and are not suitable for rapid and continuous treatment of the oil.

An object of this invention is to provide an apparatus for dehydration of oil.

Another object of this invention is to provide a novel apparatus for heating oil to desired temperatures.

A further object of this invention is to provide an apparatus for removing the moisture content from oil which includes means for heating the oil under pressure, and means for flashing the moisture containing oil into an expansion chamber in which the moisture content of the oil is vaporized and the unvaporized oil particles are collected.

Still another object of this invention is to provide an apparatus for the treatment of oil to remove moisture therefrom which comprises means for heating the oil under pressure to a temperature sufficient so that when the oil is flashed into an expansion chamber at substantially atmospheric pressure the moisture content will be vaporized, said apparatus including means for heating the walls of the expansion chamber to prevent condensation of the vaporized moisture on the walls thereof and the subsequent mixing of condensed moisture with the oil.

Still another object of this invention is to provide a heat exchanger of the tube type in which the tubes are filled with lengths of metal rope having thermal conductive contact with the walls of the tube.

Yet another object of this invention is to provide a heat exchanger of the tube type in which the tubes are filled with lengths of metal rope having thermal conductive contact with the walls thereof, said rope being formed of twisted cords of twisted wire strands to form helically extending passages adjacent the inner surface of the tubes for the flow of liquid through the tubes.

With these and other objects in view, the present invention comprises the parts and combinations hereinafter described and illustrated in the drawings and the procedure followed in effecting the dehydration of oil with the apparatus illustrated.

In the drawings:

Figure 1 is a side elevational view of a dehydrating apparatus constructed in accordance with the present invention.

Figure 2 is a horizontal sectional view of the apparatus shown in Figure 1 taken on line 2—2 thereof.

Figure 3 is a bottom sectional view taken on line 3—3 of Figure 1.

Figure 4 is a vertical sectional view taken on line 4—4 of Figure 1.

Figure 5 is a horizontal sectional view of a heat exchanger constructed in accordance with the present invention and taken on line 5—5 of Figure 4.

Figure 6 is a detailed fragmentary sectional view taken longitudinally of one of the tubes of the heat exchanger.

Figure 7 is a transverse sectional view taken on line 7—7 of Figure 6.

Figure 8 is a transverse sectional view of a metal rope element mounted in the heat exchange tubes and taken on line 8—8 of Figure 6.

Figure 9 is a view somewhat similar to Figure 6 illustrating a modified form of metal rope element.

Figure 10 is a transverse sectional view taken on line 10—10 of Figure 9.

Figure 11 is a view similar to that of Figure 10 illustrating a further modified form of the invention.

Figure 12 is a fragmentary vertical sectional view of a dehydrating device constructed in accordance with the present invention and modified to include a baffle over the vapor discharge outlet.

Figure 13 is a longitudinal sectional view of a heat exchanger embodying the tube construction illustrated in Figures 6 to 11 of the drawings.

Figure 14 is a transverse sectional view taken on line 14—14 of Figure 13.

Figure 15 is a transverse sectional view of one of the tubes of the heat exchangers shown in Figures 13 and 14.

As more clearly shown in Figures 1 to 4 of the drawings, an apparatus for effecting the separation of moisture from oil comprises an expansion chamber 1 mounted on supporting legs 2. The expansion chamber is formed of two spaced cylindrical walls 3 and 4 as indicated in Figure 4 of the drawings. Walls 3 and 4 are in the form of a pair of concentrically arranged tubes the lower ends 5 and 6 of which are deflected toward each other and joined to form a closure. At their upper ends the tubular walls 3 and 4 are connected by an annular flange-like element 7. The lower portions 5 and 6 of the tubular walls 3 and 4 may be welded together and the flange-like element 7 may be welded to said walls 3 and 4.

The flange-like element 7 is provided with a plurality of threaded holes spaced circumferentially about the same to receive studs 8 which serve to mount a closure 9 for the upper portion of the expansion chamber 1 in place. Closure 9 is provided with a central aperture 10 which may have a steam outlet duct 11 positioned therein.

Between the concentric tubular walls 3 and 4 there is provided a space 12 for a heating fluid which for purposes of description will be referred to as steam. For introducing steam into the space or jacket 12 formed between the tubular walls 3 and 4 the outer wall 3 is provided with a steam inlet fitting 13. To provide for the discharge of condensate, a condensate drain 14 is secured in an aperture formed in the joined lower portions 5 and 6 of the tubular walls 3 and 4.

Adjacent the upper portion of the expansion chamber 1 there is mounted a steam jet 15 which serves to discharge a jet of steam from the jacket 12 just below the steam outlet conduit 11.

A bottom plate 16 is welded into the bottom of the expansion chamber 1 and is provided with an enlarged central opening through which extends and into which is secured a heat exchanger. The heat exchanger comprises an outer cylindrical casing 17 and tube sheets 18 and 19 adjacent each end thereof. A plurality of tubes 20 extend through apertures in the tube sheets and are sealed in position therein. Between the tube sheets and about the exterior of the tubes 20 there is provided a space 21 for a heating medium which, as indicated in the drawings, consists of steam which is introduced into the upper portion of the space 21 by means of a steam supply conduit 22 and is discharged from the lower portion of the space 21 by means of a condensate outlet 23.

The lower end of the casing 17 of the heat exchanger is provided with an annular closure member 24 into which is mounted a short tubular member 25 to the lower end of which is secured a conical bottom 26. Element 24, the short tubular member 25 and the bottom 26 may be welded together and to the lower end of the casing 17. At the apex of the conical bottom 26 there is provided a drain fitting 27 which is closed by a plug 28. At a position above the drain fitting 27 there is provided an inlet fitting 29. From the foregoing description it will be appreciated that the tube sheet 18 and the conical bottom 26 and its associated structure provides a header for supplying a fluid to the interior of the tubes 20.

At the upper end of the casing 17 there is welded in place an annular flange-like element 30 provided with a plurality of circumferentially spaced threaded bores for receiving studs 31 which serve to secure to the upper portion of the casing 17 the upper closure member 32. A central opening 33 is provided in the closure member 32 and mounted within the opening is an upwardly extending tubular member 34. The upper end portion of the tubular member is provided with a radially inwardly extending flange 35 which is threaded to receive a valve casing 36. The latter comprises a fitting which is adapted to extend downwardly into the tubular member 34 and is provided with a plurality of openings 37 adjacent the bottom thereof and with an axial bore which receives the stem 38 of a poppet valve. At its upper end the valve casing 36 is provided with a conical seat to receive the head 39 of said poppet valve. The lower end of the valve stem 38 has a nut 40 threadedly mounted thereon and a washer 41. A spring 42 extends between the lower portion of the casing 36 and the washer 41 to urge the valve to a closed position.

The discharge header formed in the upper portion of the casing 17 above the tube sheet 19 serves as a chamber in which fluid passing through the tubes is collected and from which the fluid is discharged through the upper tubular element 34 and finally out through the opening controlled by the valve 39.

In accordance with the present invention, moisture contaminated oil is introduced through the inlet 29 in the lower portion of the heat exchanger 17 and is passed upwardly through the tubes 20. To facilitate the heat exchange between the metal of the tubes 20 and the oil passing therethrough, the present invention provides the inserts 43. As more clearly shown in Figures 6, 7 and 8 of the drawings, the inserts 43 are in the form of metal rope-like elements. Each of the rope-like elements comprises a central cord 44 which is positioned to extend along the axis of the tube 20 and a plurality of external cords 45 are twisted together about the central cord 44. Each of the cords is formed of a plurality of twisted wire strands 46. To prevent the flow of the oil into the interior of the wire rope the ends of the rope are covered with caps 47 which are formed by dipping the ends of the wire rope into molten metal such as lead or solder and shaping the same into a tapered or rounded body as indicated.

The wire ropes are of an external diameter approximating that of the tubes and form a metal to metal contact with the tubes 20. Thus heat transmitted to the tubes from th steam about the same will in turn be transmitted to the metal rope by the heat conductive contact with the tubes. Thus the metal rope-like elements form two functions, which are to transmit heat from the walls of the tubes directly to the oil, and to cause the oil passing through the tubes 20 to flow in thin helical streams. As a result the flow path of the oil through the tubes is increased and a highly efficient exchange of heat between the walls of the tubes and their associated wire rope-like elements and the oil passing through the passages within the tubes is obtained.

Cleaning the tubes of accumulated sludge may be easily effected by simply withdrawing the wire ropes therefrom.

If it is found that the rate of flow of the oil through tubes filled with the rope-like elements 43 as illustrated in Figure 6 is too slow, it is possible within the concept of the present invention to eliminate one or more of the external twisted cords forming the rope-like element. As shown in Figures 9 and 10, a rope-like element 48 is shown mounted in the tube 20 in which one of the cords 49 is omitted to form a comparatively large helical flow passage 50 through the tube 20. This large flow passage 50 together with the smaller flow passages 51 provides a comparatively large area of flow of the oil through the tubes 20.

The ends of the element 48 may be formed with the cap-like devices 47 as illustrated in Figure 6.

It is also possible to construct the wire rope-like elements so that there is an effective seal between the central cord and the twisted external cords of the rope thus avoiding the necessity of forming the end caps on the lengths of wire rope-like element extending through the tubes. For instance, the central cord 52 of the rope 53, as shown in Figure 11, may be formed of hemp or other material which is more plastic than the wire forming the strands of the external cords and will thereby serve to completely fill any voids between the adjacent cords of the wire strands.

In effecting the dehydration of oil with the apparatus hereinbefore described, steam is introduced into the jacket 12 of the expansion casing and also through the supply line 22 of the heat exchanger. The moist oil to be treated is then introduced under pressure into the lower portion of the heat exchanger and flows upwardly through the tubes 20 in the helical passages formed within the tubes by means of the wire rope-like elements 43. The heated oil which is introduced into the heat exchanger under pressure is heated and emerges from the upper end of the tubes 20 and is forced outwardly through the opening controlled by the spring loaded valve 39 in the form of a spray as indicated by the arrows in Figure 4. The release of pressure on the heated moisture containing oil effected by spraying the oil into the expansion chamber 1 causes the moisture content of the oil to be vaporized and the entrained oil particles are sprayed outwardly onto the heated walls 4 of the chamber 1. By maintaining the walls 4 of the chamber heated there is no tendency to effect condensation of the water vapor which is flashed into the chamber 1. Oil which is collected in the chamber 1 is discharged through the outlet 54 and the moisture in the form of steam passes out through the outlet conduit 11 formed in the upper portion of the chamber 1.

For preventing oxidation of the oil in the chamber 1, a spray of steam introduced through the jet 15 immediately below the steam outlet 11 forms a closure to prevent the influx of atmospheric air into the chamber 1.

In another form of the present invention, as illustrated in Figure 12, a baffle 55 secured to the upper closure member 9 of the chamber 1 by means of supports 56 serves to shield the outlet 11 in the closure 9. This serves to reduce the loss of oil which may be entrained and carried out through the outlet 11 by the discharged steam and also tends to prevent the influx of air into chamber 1.

The principle of the present invention which resides in the provision of the wire rope-like elements within the tubes of a heat exchanger to increase the exchange of heat between the walls of the tubes and a fluid passing therethrough may be applied to various types of tubular heat exchangers. For instance, as illustrated in Figure 13 of the drawings, this principle may be applied to a somewhat conventional type of heat exchanger. As illustrated, the heat exchanger comprises an outer casing 57 having tube sheets 58 and 59 welded in place adjacent the ends thereof. Extending through openings in the tube sheets 58 and 59 are a plurality of tubes 60 which are welded or otherwise sealed within the openings.

The space between the tube sheets 58 and 59 through which the tubes extend serves as a heating medium chamber into which a heating medium is supplied and from which it is discharged by means of the fittings 61 and 62, either of which may serve as an inlet or an outlet, depending upon the type of heating medium employed. Detachable conical closure members 63 and 64 are provided for the ends of the heat exchanger. Each of these members is provided with an outwardly radially extending flange 65 and an axially extending flange 66 which cooperate to receive the ends of the casing 57. The ends of the casing 57 may be reinforced by welding thereto annular elements 67 as illustrated.

Each tube sheet is provided at its central portion with a threaded boss 68 in which is received the threaded end of a bolt 69 which passes through an opening in the apex of the conical closure members 63 and 64. The head 70 of the bolts cooperate with sealing gasket 71 to close the openings in the conical closures 63 and 64 and suitable gaskets 72 are provided between the ends of the casing 57 and the flanges 65 and 66 of the conical closure to effect a leak-proof seal.

The end closures 63 and 64 are provided with openings 73 and 74, respectively, either of which may serve as the inlet or the outlet for a fluid to be heated, depending upon the type of fluid to be heated and the type of heating medium employed.

Extending through each of the tubes 60 is a wire rope-like element 75 which is constructed in the manner illustrated in Figures 6 to 11 that is formed entirely of wire in which the central cord 76 is completely surrounded by cords 77 forming a plurality of somewhat helical flow paths 78 or in which one of the external cords 77 is omitted to form a large helical flow path in conjunction with the small flow path 78. The wire rope-like elements may be provided with the end closures 79 or the central cord of the rope may be formed as illustrated in Figure 11.

The heat exchanger shown in Figures 13 to 15 is very efficient in operation both when a fluid to be heated is passed through the helical passages formed in the tubes or conversely in the case where a fluid to be cooled is passed through the helical passages formed in the tubes.

From the foregoing description, it will be appreciated that we have provided means for effectively dehydrating oil by heating the same in a novel manner under pressure, releasing the pressure thereon to provide for the vaporization of the moisture and the separation of oil therefrom, and that we have provided a heat exchange constructed to include means for more effectively transferring heat from the wall of a tube to a fluid passing therethrough.

We claim:

1. An apparatus for heating oil and separating moisture therefrom comprising an expansion chamber having a double wall with a space between the inner and outer surfaces thereof, means for introducing a heating medium into the space between the surfaces of the double wall, said expansion chamber having a discharge opening in the upper portion thereof, an oil heating device mounted within said expansion chamber, means for introducing oil into said heating device under pressure, and means for flashing the heated oil into the expansion chamber onto the upper portions of the double wall.

2. An apparatus for heating oil and separating moisture therefrom comprising an expansion chamber having a double wall with a space between the inner and outer surfaces thereof, means for introducing a heating medium into the space between the surfaces of the double wall, said expansion chamber having a discharge opening in the upper portion thereof, an oil heating device mounted within said expansion chamber, means for introducing oil into said heating device under pressure, means for flashing the heated oil into the expansion chamber onto the upper portions of the double wall, and means for introducing steam into the upper portion of said expansion chamber adjacent the discharge opening.

3. An apparatus for heating oil and separating moisture therefrom comprising an expansion chamber having a double wall with a space between the inner and outer surfaces thereof, means for introducing a heating medium into the space between the surfaces of the double wall, said expansion chamber having a discharge opening in the upper portion thereof, an oil heating device mounted within said expansion chamber, means for introducing oil into said heating device under pressure, said heating device having a heated oil outlet in its upper portion, a loaded valve controlling the flash discharge of heated oil from said outlet and for deflecting discharged oil against the heated wall of the chamber.

4. An apparatus for heating oil and separating moisture therefrom comprising an expansion chamber having a double wall with a space between the inner and outer surfaces thereof, means for introducing a heating medium into the space between the surfaces of the double wall, said expansion chamber having a discharge opening in the upper portion thereof, an oil heating device mounted within said expansion chamber, means for introducing oil into said heating device under pressure, said heating device having a heated oil outlet in its upper portion, a loaded valve controlling the flash discharge of heated oil from said outlet and for deflecting discharged oil against the double wall of the chamber, and means for introducing steam into the upper portion of said expansion chamber adjacent the discharge opening.

5. An apparatus for heating oil and separating moisture therefrom comprising an expansion chamber having a double wall with a space between the inner and outer surfaces thereof, means for introducing a heating medium into the space between the surfaces of the double wall, said expansion chamber having a discharge opening in the upper portion thereof, an oil heating device mounted within said expansion chamber, means for introducing oil into said heating device under pressure, said heating device having a heated oil outlet in its upper portion, a loaded valve controlling the flash discharge of heated oil from said outlet and for deflecting discharged oil against the double wall of the chamber, said oil heating device comprising a heat exchanger having a plurality of tubes, means for passing the oil through the tubes, means for passing a heating medium about the exterior of the tubes, and lengths of twisted stranded wire rope extending longitudinally of the tubes.

6. An apparatus for heating oil and separating moisture therefrom comprising an expansion chamber having a double wall with a space between the inner and outer surfaces thereof, means for introducing a heating medium into the space between the surfaces of the double wall, said expansion chamber having a discharge opening in the upper portion thereof, an oil heating device mounted within said expansion chamber, means for introducing oil into said heating device under pressure, said heating device having a heated oil outlet in its upper portion, a loaded valve controlling the flash discharge of heated oil from said outlet and for deflecting discharged oil against the double wall of the chamber, said oil heating device comprising a heat exchanger having a plurality of tubes, means for passing the oil through the tubes, means for passing a heating medium about the exterior of the tubes, lengths of twisted stranded wire rope extending longitudinally through the tubes, and means for closing the openings in the ends of wire rope.

7. An apparatus for heating oil and separating moisture therefrom comprising a vertical cylindrical expansion chamber the circumferential wall of which is of double thickness with a space therebetween, means for introducing a heating medium into said space to heat said circumferential wall, said expansion chamber having a vapor discharge outlet in the central portion of the top thereof open to the atmosphere and a liquid discharge opening in the bottom thereof, a heat exchanger mounted in the central lower portion of the expansion chamber, means for introducing an oil to be heated and dehydrated into said heat exchanger under pressure, means for passing a heating fluid through said heat exchanger, a discharge device on the upper portion of the heat exchanger substantially at the central portion of the expansion chamber having an oil outlet opening, and a loaded valve for controlling the oil outlet opening and deflecting the oil flashed therefrom against the heated wall of the expansion chamber.

8. An apparatus for heating oil and separating moisture therefrom comprising a vertical cylindrical expansion chamber the circumferential wall of which is of double thickness with a space therebetween, means for introducing a heating medium into said space to heat said circumferential wall, said expansion chamber having a vapor discharge outlet in the central portion of the top thereof open to the atmosphere and a liquid discharge opening in the bottom thereof, a heat exchanger mounted in the central lower portion of the expansion chamber, means for introducing an oil to be heated and dehydrated into said heat exchanger under pressure, means for passing a heating fluid through said heat exchanger, a discharge device on the upper portion of the heat exchanger substantially at the central portion of the expansion chamber having an oil outlet opening, a loaded valve for controlling the oil outlet opening and deflecting the oil flashed therefrom against the heated wall of the expansion chamber, and a baffle positioned between the loaded valve and the vapor discharge opening.

9. An apparatus for heating oil and separating moisture therefrom comprising a vertical cylindrical expansion chamber the circumferential wall of which is of double thickness with a space therebetween, means for introducing a heating medium into said space to heat said circumferential wall, said expansion chamber having a vapor discharge outlet in the central portion of the top thereof open to the atmosphere and a liquid discharge opening in the bottom thereof, a heat exchanger mounted in the central lower portion of the expansion chamber, means for introducing an oil to be heated and dehydrated into said heat exchanger under pressure, means for passing a heating fluid through said heat exchanger, a discharge device on the upper portion of the heat exchanger substantially at the central portion of the expansion chamber having an oil outlet opening, a loaded valve for controlling the oil outlet opening and deflecting the oil flashed therefrom against the heated wall of the expansion chamber, and means for discharging steam into the expansion chamber between the heat exchanger and the vapor discharge outlet.

10. An apparatus for heating oil and separating moisture therefrom comprising a vertical cylindrical expansion chamber the circumferential wall of which is of double thickness with a space therebetween, means for introducing a heating medium into said space to heat said circumferential wall, said expansion chamber having a vapor discharge outlet in the central portion of the top thereof open to the atmosphere and a liquid discharge opening in the bottom thereof, a heat exchanger mounted in the central lower portion of the expansion chamber, means for introducing an oil to be heated and dehydrated into said heat exchanger under pressure, means for passing a heating fluid through said heat exchanger, a discharge device on the upper portion of the heat exchanger substantially at the central portion of the expansion chamber having an oil outlet opening, a loaded valve for controlling the oil outlet opening and deflecting the oil flashed therefrom against the heated wall of the expansion chamber, said heat exchanger having a plurality of tubes, means for passing the oil through the tubes, means for passing a heating medium about the exterior of the tubes, and lengths of twisted stranded wire rope extending longitudinally of the tubes.

11. An apparatus for heating oil and separating moisture therefrom, comprising a vertical cylindrical expansion chamber, said expansion chamber having a vapor discharge outlet in the central portion of the top thereof open to the atmosphere and a liquid discharge opening in the bottom thereof, a heat exchanger mounted in the central lower portion of the expansion chamber, means for introducing an oil to be heated and dehydrated into said heat exchanger under pressure, means for passing a heating fluid through said heat exchanger, a discharge device on the upper portion of the heat exchanger substantially at the central portion of the expansion chamber having an oil outlet opening, and a loaded valve for controlling the oil outlet opening and deflecting the oil flashed therefrom against the heated wall of the expansion chamber.

SOUTHWICK W. BRIGGS.
WALTER C. BAUER.
WALTER J. EWBANK.
ROSCOE C. PORTER.

Certificate of Correction

Patent No. 2,393,965.  February 5, 1946.

SOUTHWICK W. BRIGGS ET AL.

It is hereby certified that the above numbered patent was erroneously issued to "Briggs Clarifier Company" as assignee whereas said patent should have been issued to Southwick W. Briggs, of Washington, District of Columbia, Walter C. Bauer, of Chevy Chase, Walter J. Ewbank, of Kensington, Maryland, and Roscoe C. Porter, of Arlington, Virginia; said Bauer, Ewbank and Porter, assignors to Briggs Clarifier Company, of Washington, District of Columbia, a corporation of Delaware, as shown by the record of assignments in this office; and that the said Letters Patents should be read with this correction therein that the same may conform to the record of the case in the Patent Office.

Signed and sealed this 30th day of April, A. D. 1946.

[SEAL]

LESLIE FRAZER,
*First Assistant Commissioner of Patents.* heating fluid through said heat exchanger, a discharge device on the upper portion of the heat exchanger substantially at the central portion of the expansion chamber having an oil outlet opening, a loaded valve for controlling the oil outlet opening and deflecting the oil flashed therefrom against the heated wall of the expansion chamber, and means for discharging steam into the expansion chamber between the heat exchanger and the vapor discharge outlet.

10. An apparatus for heating oil and separating moisture therefrom comprising a vertical cylindrical expansion chamber the circumferential wall of which is of double thickness with a space therebetween, means for introducing a heating medium into said space to heat said circumferential wall, said expansion chamber having a vapor discharge outlet in the central portion of the top thereof open to the atmosphere and a liquid discharge opening in the bottom thereof, a heat exchanger mounted in the central lower portion of the expansion chamber, means for introducing an oil to be heated and dehydrated into said heat exchanger under pressure, means for passing a heating fluid through said heat exchanger, a discharge device on the upper portion of the heat exchanger substantially at the central portion of the expansion chamber having an oil outlet opening, a loaded valve for controlling the oil outlet opening and deflecting the oil flashed therefrom against the heated wall of the expansion chamber, said heat exchanger having a plurality of tubes, means for passing the oil through the tubes, means for passing a heating medium about the exterior of the tubes, and lengths of twisted stranded wire rope extending longitudinally of the tubes.

11. An apparatus for heating oil and separating moisture therefrom, comprising a vertical cylindrical expansion chamber, said expansion chamber having a vapor discharge outlet in the central portion of the top thereof open to the atmosphere and a liquid discharge opening in the bottom thereof, a heat exchanger mounted in the central lower portion of the expansion chamber, means for introducing an oil to be heated and dehydrated into said heat exchanger under pressure, means for passing a heating fluid through said heat exchanger, a discharge device on the upper portion of the heat exchanger substantially at the central portion of the expansion chamber having an oil outlet opening, and a loaded valve for controlling the oil outlet opening and deflecting the oil flashed therefrom against the heated wall of the expansion chamber.

SOUTHWICK W. BRIGGS.
WALTER C. BAUER.
WALTER J. EWBANK.
ROSCOE C. PORTER.

Certificate of Correction

Patent No. 2,393,965.   February 5, 1946.

SOUTHWICK W. BRIGGS ET AL.

It is hereby certified that the above numbered patent was erroneously issued to "Briggs Clarifier Company" as assignee whereas said patent should have been issued to Southwick W. Briggs, of Washington, District of Columbia, Walter C. Bauer, of Chevy Chase, Walter J. Ewbank, of Kensington, Maryland, and Roscoe C. Porter, of Arlington, Virginia; said Bauer, Ewbank and Porter, assignors to Briggs Clarifier Company, of Washington, District of Columbia, a corporation of Delaware, as shown by the record of assignments in this office; and that the said Letters Patents should be read with this correction therein that the same may conform to the record of the case in the Patent Office.

Signed and sealed this 30th day of April, A. D. 1946.

[SEAL]

LESLIE FRAZER,
*First Assistant Commissioner of Patents.*